US011109436B2

(12) United States Patent
Turtinen et al.

(10) Patent No.: US 11,109,436 B2
(45) Date of Patent: Aug. 31, 2021

(54) REJECTION OF CONNECTION RE-ESTABLISHMENT

(71) Applicant: Nokia Technologies Oy, Espoo (FI)

(72) Inventors: Samuli H. Turtinen, Ii (FI); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/443,134

(22) Filed: Jun. 17, 2019

(65) Prior Publication Data

US 2019/0394824 A1  Dec. 26, 2019

Related U.S. Application Data

(60) Provisional application No. 62/687,985, filed on Jun. 21, 2018.

(51) Int. Cl.
| | | |
|---|---|---|
| *H04W 76/19* | (2018.01) | |
| *H04W 76/18* | (2018.01) | |
| *H04W 74/08* | (2009.01) | |
| *H04W 88/02* | (2009.01) | |

(52) U.S. Cl.
CPC ....... *H04W 76/19* (2018.02); *H04W 74/0833* (2013.01); *H04W 76/18* (2018.02); *H04W 88/02* (2013.01)

(58) Field of Classification Search
CPC .. H04W 76/19; H04W 76/18; H04W 74/0833
See application file for complete search history.

(56) References Cited

U.S. PATENT DOCUMENTS

| | | | |
|---|---|---|---|
| 9,398,494 | B2 | 7/2016 | Han et al. |
| 2001/0018342 | A1* | 8/2001 | Vialen ............... H04Q 7/20 |
| 2010/0067498 | A1 | 3/2010 | Lee et al. |
| 2011/0299465 | A1 | 12/2011 | Iwamura et al. |
| 2012/0236707 | A1 | 9/2012 | Larsson et al. |
| 2012/0269122 | A1* | 10/2012 | Lee ............... H04W 74/00 |
| 2013/0083753 | A1* | 4/2013 | Lee ............... H04W 72/04 |
| 2015/0003355 | A1 | 1/2015 | Dalsgaard et al. |
| 2015/0009802 | A1* | 1/2015 | Wager ............... H04W 76/02 |

(Continued)

FOREIGN PATENT DOCUMENTS

WO    2017/065468 A1    4/2017

OTHER PUBLICATIONS

"Reject Message at Re-establishment", 3GPP TSG-RAN WG2 #102, Tdoc R2-1807918, Agenda : 10.4.13.5, Ericsson, May 21-25, 2018, pp. 1-3.

(Continued)

*Primary Examiner* — Ronald B Abelson
(74) *Attorney, Agent, or Firm* — Harrington & Smith

(57) ABSTRACT

In accordance with an example embodiment of the present invention, an apparatus comprising: at least one processor; and at least one memory including computer program code, wherein the at least one memory and the computer program code are configured to, with the at least one processor, cause the apparatus to: transmit a request to reestablish a connection with a network node; receive an early contention resolution message in response to the request; and determine whether or not the request is rejected by the network based at least in part on the early contention resolution message.

14 Claims, 4 Drawing Sheets

(56) References Cited

U.S. PATENT DOCUMENTS

| | | | |
|---|---|---|---|
| 2016/0142992 A1* | 5/2016 | Chien | H04W 56/001 |
| 2017/0064736 A1* | 3/2017 | Yu | |
| 2017/0126480 A1* | 5/2017 | Youtz | H04L 12/24 |
| 2017/0265243 A1 | 9/2017 | Hahn et al. | |
| 2017/0346545 A1* | 11/2017 | Islam | H04B 7/08 |

OTHER PUBLICATIONS

"Introduction of Support for Mac PDU Containing UE Contention Resolution Identity Mac Control Element without RRC Response Message in NB-IoT", 3GPP TSG-RAN WG2 Meeting #102, R2-1807093, Qualcomm Incorporated, May 21-25, 2018, pp. 1-9.

"Background to Early Contention Resolution", 3GPP TSG RAN WG2 #101bis, Tdoc R2-1804737, Agenda : 8.11, Qualcomm Incorporated, Apr. 16-20, 2018, pp. 1-5.

Rupp, "Design and Architectures for Signal and Image Processing", EURASIP Journal on Embedded Systems, Jan. 2008, 5 pages.

* cited by examiner

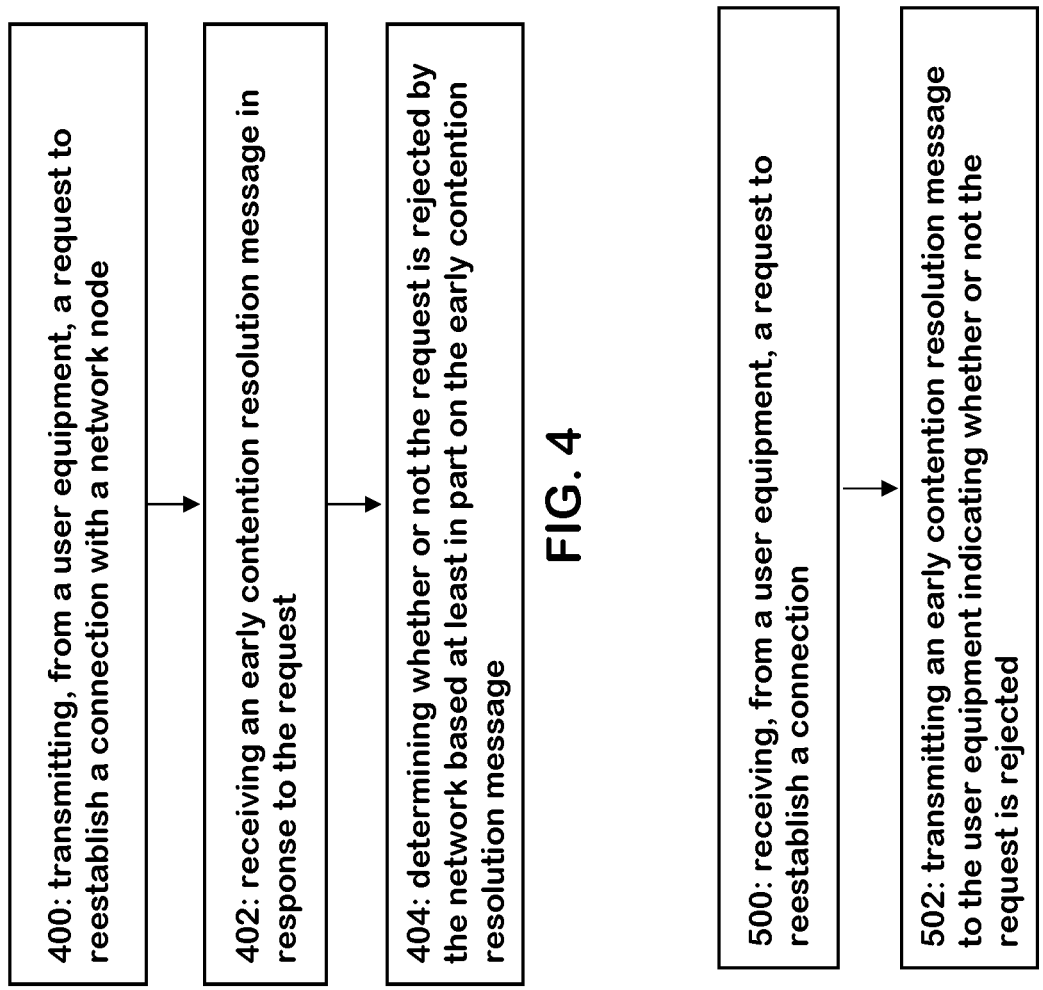

REJECTION OF CONNECTION RE-ESTABLISHMENT

TECHNICAL FIELD

Various example embodiments relate generally to wireless communication networks and, more specifically, relate to connection control procedures in wireless communications networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

A user equipment that is connected to wireless network may become disconnected from the wireless network due to various factors such as interference and/or poor signal strength. This is typically referred to as radio link failure (RLF). When RLF occurs, the user equipment may attempt to reestablish the connection with the wireless network.

Abbreviations that may be found in the specification and/or the drawing figures are defined below, at the beginning of the detailed description section.

BRIEF DESCRIPTION OF THE DRAWINGS

Various aspects of examples of the invention are set out in the claims.

According to a first aspect of the present invention, an apparatus comprising: at least one processor; and at least one memory including computer program code, wherein the at least one memory and the computer program code are configured to, with the at least one processor, cause the apparatus to at least: transmit a request to reestablish a connection with a network node; receive an early contention resolution message in response to the request; and determine whether or not the request is rejected by the network based at least in part on the early contention resolution message.

According to a second aspect of the present invention, a method comprising: transmitting a request to reestablish a connection with a network node; receiving an early contention resolution message in response to the request; and determining whether or not the request is rejected by the network based at least in part on the early contention resolution message.

According to a third aspect of the present invention, a computer program product comprising a non-transitory computer-readable medium bearing computer program code embodied therein for use with a computer, the computer program code comprising: transmitting a request to reestablish a connection with a network node; receiving an early contention resolution message in response to the request; and determining whether or not the request is rejected by the network based at least in part on the early contention resolution message.

According to a fourth aspect of the present invention, an apparatus comprising: at least one processor; and at least one memory including computer program code, wherein the at least one memory and the computer program code are configured to, with the at least one processor, cause the apparatus to at least: receive, from a user equipment, a request to reestablish a connection; and transmit an early contention resolution message to the user equipment indicating whether or not the request is rejected.

According to a fifth aspect of the present invention, a method comprising: receiving, from a user equipment, a request to reestablish a connection; and transmitting an early contention resolution message to the user equipment indicating whether or not the request is rejected.

According to a sixth aspect of the present invention, a computer program product comprising a non-transitory computer-readable medium bearing computer program code embodied therein for use with a computer, the computer program code comprising: receiving, from a user equipment, a request to reestablish a connection; and transmitting an early contention resolution message to the user equipment indicating whether or not the request is rejected.

BRIEF DESCRIPTION OF THE DRAWINGS

Figure 1:
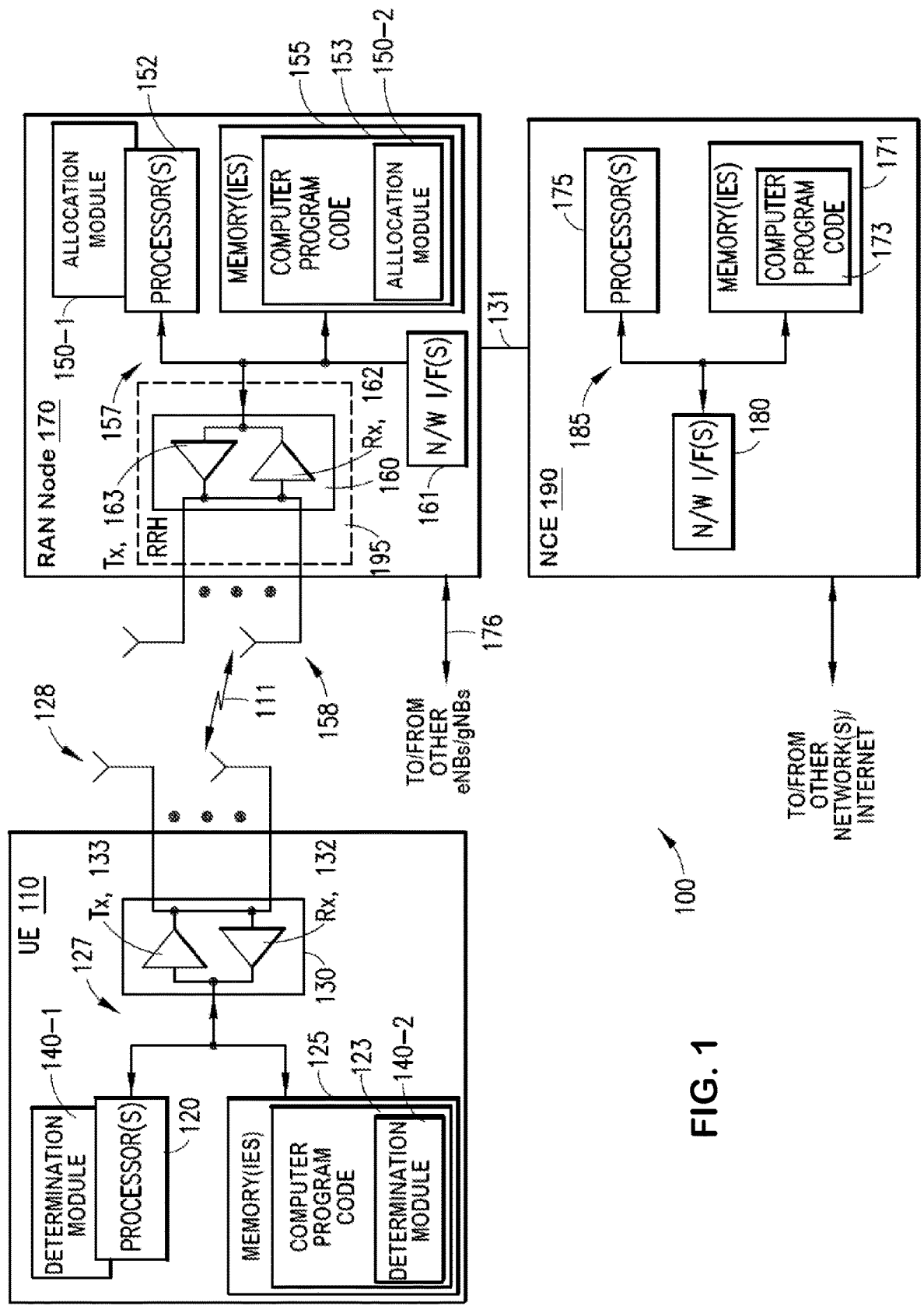
Figure 2:
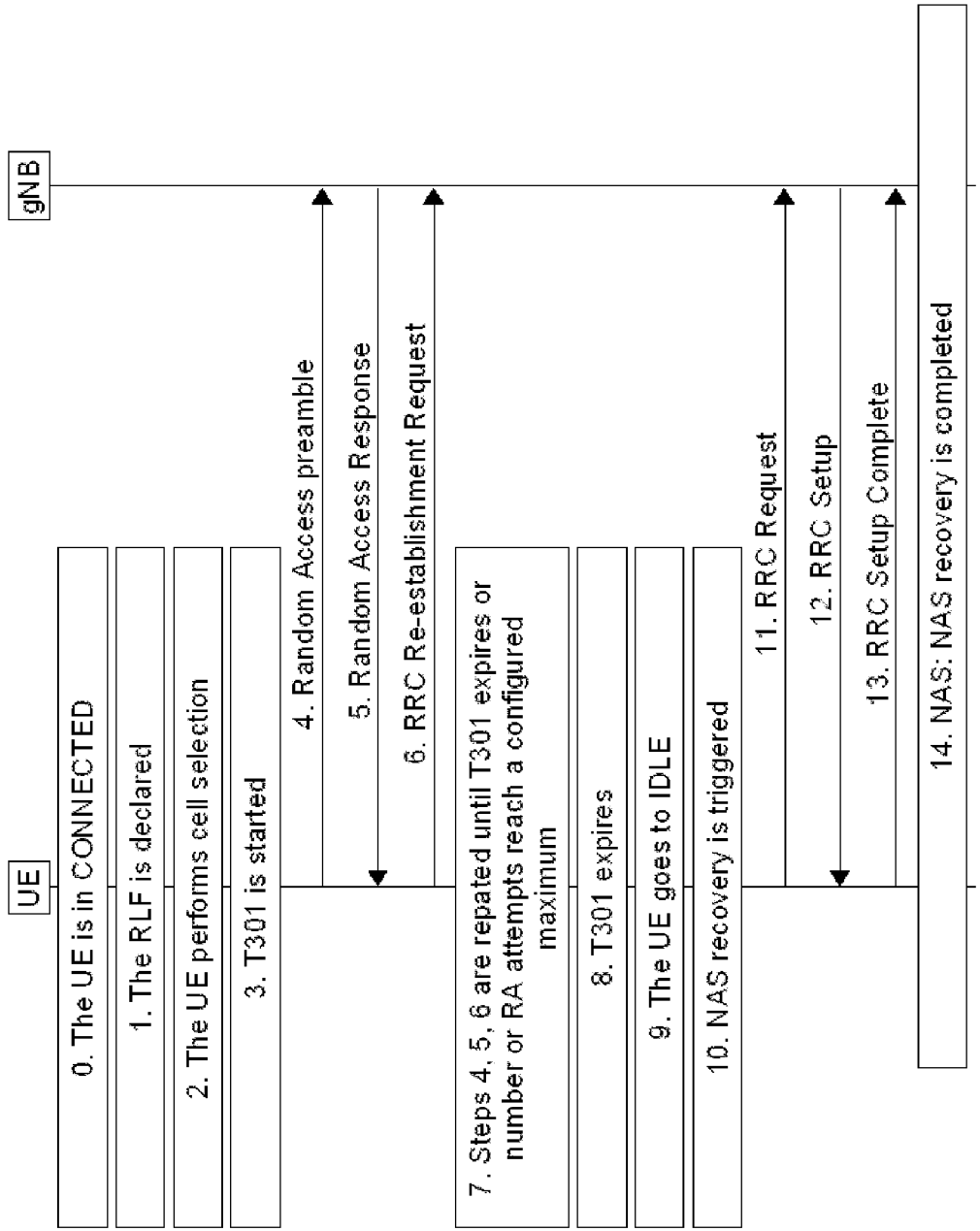
Figure 3:
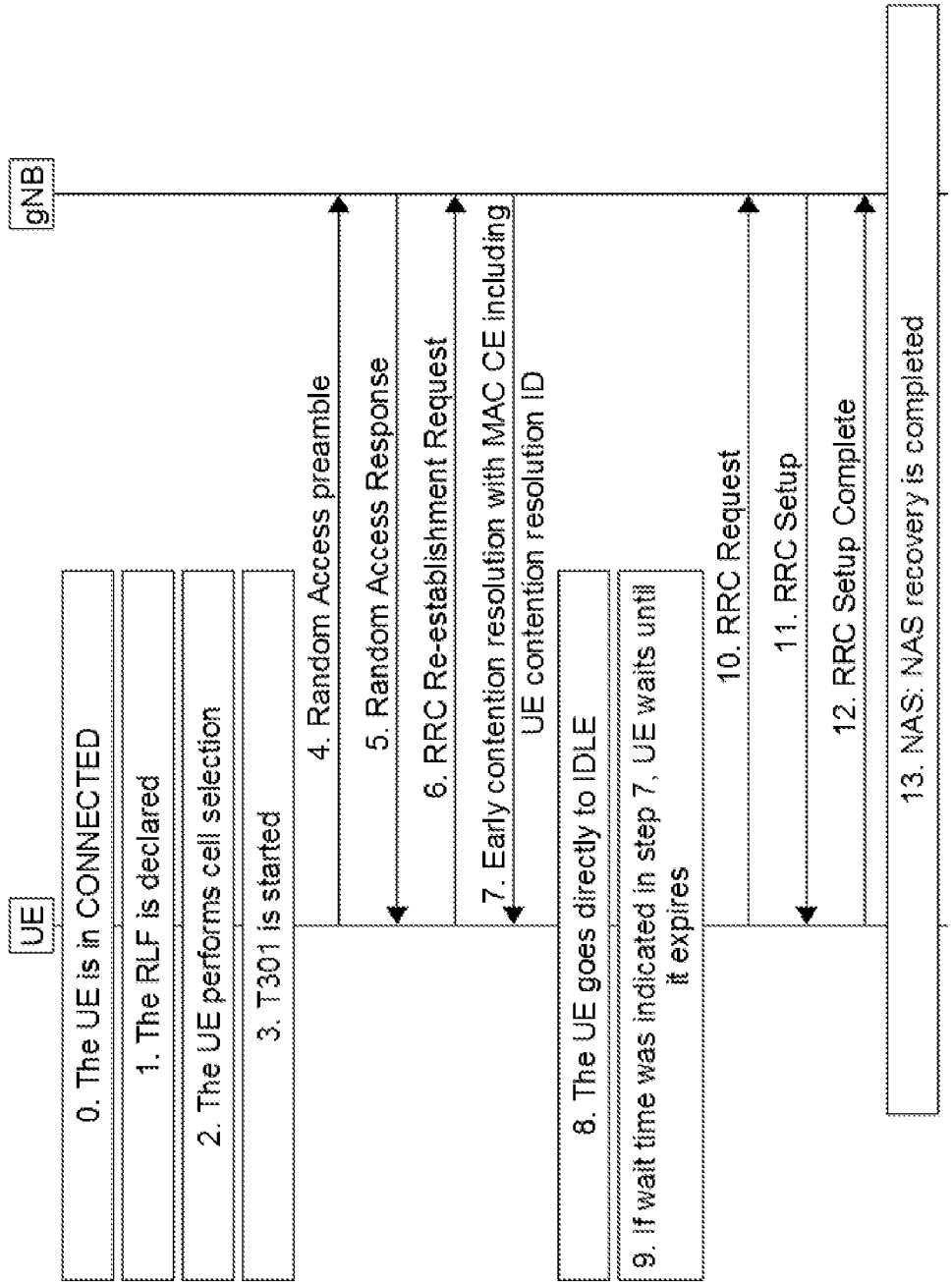

In the attached Drawing Figures:

FIG. 1 is a block diagram of one possible and non-limiting exemplary system in which the exemplary embodiments may be practiced;

FIG. 2 shows a signaling diagram between a user equipment and network;

FIG. 3 shows another signaling diagram between a user equipment and network in accordance with various example embodiments; and FIGS. 4 and 5 are logic flow diagrams for implicit rejection of connection re-establishment, and illustrate the operation of exemplary methods, a result of execution of computer program instructions embodied on a computer readable memory, functions performed by logic implemented in hardware, and/or interconnected means for performing functions in accordance with exemplary embodiments.

DETAILED DESCRIPTION OF THE DRAWINGS

The following abbreviations that may be found in the specification and/or the drawing figures are defined as follows:
3GPP third generation partnership project
5G fifth generation
CE control element
eNB (or eNodeB) evolved Node B (e.g., an LTE base station)
gNB (or gNodeB) base station for 5G/NR
I/F interface
LCID logical channel identity
LTE long term evolution
MME mobility management entity
NCE network control element
NR new radio
N/W or NW network
RA random access
Rel release
RLF radio link failure
RRH remote radio head
Rx receiver
SGW serving gateway
TS technical specification
Tx transmitter
UE user equipment (e.g., a wireless, typically mobile device)

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for implicit rejection of connection re-establishment. Additional description of these techniques is presented after a system into which the exemplary embodiments may be used is described.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a connection module, comprising one of or both parts 140-1 and/or 140-2, which may be implemented in a number of ways. The connection module 140 may be implemented in hardware as connection module 140-1, such as being implemented as part of the one or more processors 120. The connection module 140-1 may be implemented also as an integrated circuit or through other hardware such as a programmable gate array. In another example, the connection module may be implemented as connection module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with radio access network (RAN) node 170 via a wireless link 111.

The RAN node 170 may be a base station that provides access by wireless devices such as the UE 110 to the wireless network 100. For example, the RAN node 170 may be a node (e.g. a base station) in a NR/5G network such as a gNB (a node that provides NR user plane and control protocol terminations towards the UE 110) or an ng-eNB (a node providing E-UTRA user plane and control plane protocol terminations towards the UE 110, and connected via an NG interface to the core network (i.e. 5G Core (5GC)). The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The RAN node 170 includes a configuration module, comprising one of or both parts 150-1 and/or 150-2, which may be implemented in a number of ways. The control module may be implemented in hardware as control module 150-1, such as being implemented as part of the one or more processors 152. The control module 150-1 may be implemented also as an integrated circuit or through other hardware such as a programmable gate array. In another example, the control module may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. The one or more network interfaces 161 communicate over a network such as via the links 176 and 131. Two or more RAN nodes 170 communicate using, e.g., link 176. The link 176 may be wired or wireless or both and may implement, for example, an Xn interface for 5G, an X2 interface for LTE, or any other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the RAN node 170 being physically in a different location from the RRH, and the one or more buses 157 could be implemented in part as fiber optic cable to connect the other elements of the RAN node 170 to the RRH 195.

It is noted that various base station functions may be virtualized functions instantiated on an appropriate platform, such as a cloud infrastructure. For example, the RAN node 170 may include a gNB centralized unit (gNB-CU) and one or more gNB distributed units (gNB-DU) interconnected through an F1 logical interface. Together, a gNB-CU, underlying gNB-DUs, and RRHs may be considered as forming a logical base station. The gNB-CU may be considered a logical node that hosts some base station functions (such as non real-time functions for example), and may control, at least in part, the operations of the one or more gNB-DUs. The one or more gNB-DUs may host the remaining base station functions (such as the real-time functions for example). As an example, the gNB-CU may host the RRC, SDAP, and PDCP protocols and the one or more gNB-DUs may host the RLC, MAC and PHY layer protocols for example.

It is also noted that the description herein indicates that "cells" perform functions, but it should be clear that the RAN node that forms the cell will perform the functions. The cell makes up part of a RAN node. That is, there can be multiple cells per RAN node. For instance, there could be three cells for a single RAN node carrier frequency and associated bandwidth, each cell covering one-third of a 360 degree area so that the single RAN node's coverage area covers an approximate oval or circle. Furthermore, each cell can correspond to a single carrier and a RAN node may use multiple carriers. So if there are three 120 degree cells per carrier and two carriers, then the RAN node has a total of 6 cells.

The wireless network 100 may include network control element (NCE) 190 which includes functionalities for carrying out a set of network functions (NFs), and may provide connectivity with a further network, such as a telephone network and/or a data communications network (e.g., the Internet). The set of NFs may include, for example, an Access and Mobility Function (AMF) and a User Plane Function (UPF). The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations. The RAN node 170 is coupled via a link 131 to the NCE 190. The link 131 may be implemented as, e.g., an NG interface for 5G, or an S1 interface for LTE, or other suitable interface for other standards. In case of LTE network, the NCE 190 may include a MME (Mobility Management Entity) and SGW (serving gateway) functionalities.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

As noted above, a user equipment (UE) may become disconnected from a wireless network due to radio link failure (RLF). In such cases the user equipment may attempt to reestablish the connection with the network by sending a RRC Re-establishment request. In some cases the network may determine that the request should be rejected. For example, in LTE, the network could reject a connection re-establishment request by sending an RRC reject message (e.g. RRCReestablishmentReject) to the user equipment.

Recently, the 3GPP RAN2 group agreed that these type of RRC reject messages should not be supported in NR. This agreement was partly made based on the assumption that the network should prioritize returning the UE to connection for the re-establishment case. However, the network may not even have chance to attempt to prioritize a UE in this case if, for example, there is congestion in the NW node/cell. Thus, in at least some circumstances it would be beneficial to allow the network to reject the UE connection. When reaching this agreement, it was believed that the NW would not need to respond to the UE as the re-establishment attempt will be aborted based on the RRC timer as shown in the example signaling diagram in FIG. 2 for example. However, this approach may create an unnecessary load to the PRACH as the UE may attempt to transmit RA preamble until the NW sends either an RRCSetup message (fall back to Re-establishment request) or RRCReestablishment message.

Referring now to FIG. 2, this figure shows a signaling diagram that includes the following steps:

Step 0: UE 201 is in CONNECTED state

Step 1: UE 201 declares radio link failure

Step 2: UE 201 performs cell selection

Step 3: UE 201 starts a timer (i.e. T301)

Step 4: UE sends a random access preamble to gNB 202

Step 5: gNB 202 sends a random access response to the UE 201

Step 6: UE 201 sends an RRC Re-establishment Request to gNB 202

Step 7: Step 4, 5, 6 are repeated until T301 timer expires or number of random access attempts reaches a threshold, such as a preconfigured threshold Step 8: T301 expires Step 9: UE 201 goes to IDLE state Step 10: NAS recovery is triggered Step 11: UE 201 sends a RRC Request message to the gNB 202

Step 12: gNB 202 sends a RRC setup message to the UE 201

Step 13: UE sends an RRC Setup Complete message to the gNB 202

Step 14: NAS recovery is completed.

Various example embodiments described herein allow the network to reject the UE's establishment request without the use of radio resource control signaling, which allows the UE to avoid creating an unnecessary load to PRACH with numerous attempts in case the network does not respond to a RRC re-establishment message. According to some embodiments, the UE is able to refrain from transmitting unnecessary RA attempts, while the NW is overloaded and cannot accept the UE connection re-establishment. In some examples, this is accomplished by sending a MAC control element (CE) in an early contention resolution message (often referred to as 'Msg4'). Early contention resolution message may also refer to Msg4 which includes the UE contention resolution identity MAC CE alone without the corresponding RRC message in response to RRC Re-establishment request. The NW may thus end the RA procedure for the UE without any RRC message. The UE may determine whether the re-establishment request has been rejected based on, for example, the following options:

In one option, UE interprets an early contention resolution message as implicitly rejecting the re-establishment request and then initiates a procedure to leave CONNECTED mode. The UE's behavior in response to receiving the early contention resolution message may be based on the system information of the cell. For example, the cell's system information may include an indication that any early contention resolution message received in response to the connection re-establishment request should be treated as a rejection to the re-establishment request.

In another option, a downlink MAC control element (DL MAC CE) may be configured to indicate whether the UE should regard the early contention resolution message as a rejection or whether the UE should wait for a subsequent RRC message. For this option a logical channel identifier (LCID) may be allocated such that the UE determines whether the re-establishment request is rejected based on the LCID. For example, whenever the LCID is present (or not present), the UE regards this as a rejection to the re-establishment request. The MAC subheader with the LCID only may be regarded as a DL MAC CE.

Alternatively or additionally, the MAC layer may implement a rejection timer which is started in response to receiving the early contention resolution message. The value of the rejection timer could be configured, for example, in system information or could be provided explicitly in the early contention resolution message. Upon expiry of the rejecting timer, the UE may interpret the re-establishment request as being rejected and go to IDLE mode. It is noted that this will eventually lead to the UE performing a new RACH procedure when connection establishment is attempted.

Alternatively or additionally, the MAC layer could implement a 'wait timer'. Upon expiry of the wait timer, the UE is allowed to start a new RACH procedure to attempt RRC re-establishment (if the RRC timer (e.g. T301) has not expired) or transmit an RRC setup request (if the RRC timer has expired). The wait timer is started upon reception of the early contention resolution message and may be configured similarly as mentioned for the rejection timer above, such as via system information or the early contention resolution message for example.

In some example embodiments, the above options are applicable only if the re-establishment procedure would lead the UE to change cells during the cell selection procedure compared to the cell where the connection was previously ongoing.

Referring now to FIG. 3, this figure is an example signaling diagram between a UE 301 and a gNB 302 in accordance with various example embodiments. The UE may be implemented as UE 110 in FIG. 1 for example, and the gNB 302 may be implemented as RAN node 170 for example. Steps 0-6 are similar to steps 0-6 in FIG. 2. At step 7 the gNB 302 transmits an early contention resolution message to the UE 301. The early contention resolution message may be configured so that the UE may implicitly determine whether the re-establishment request has been rejected based on, for example, the options above. For example:

UE 301 may determine that the RRC Re-establishment request sent in step 6 is implicitly rejected based on receipt of the early contention resolution message having a UE contention resolution ID of step 7; or The early contention resolution message in step 7 may include a MAC CE that is identified by a MAC PDU subheader with a specific LCID, where the presence of the LCID indicates that the RRC Re-establishment request is rejected by the gNB 302. The MAC CE may thus have a fixed size of zero bits given the LCID in the corresponding MAC PDU subheader encodes the reject information.

In some examples, the RRC Re-establishment request may also be considered as being rejected by the gNB 302 based on expiry of the rejection timer. It is also noted that in some examples the early contention resolution message in step 7 may indicate timer information for the wait timer and/or the rejection timer.

In step 8, if the UE 301 determines that the re-establishment request was rejected, then the UE 301 may go directly to IDLE mode. If the wait timer is being utilized, such as if information was included in the early contention message, then the UE 301 waits until expiry of the wait timer in step 9. Upon expiry of the wait timer, the UE 301 proceeds to start a new RACH procedure to attempt RRC re-establishment (if RRC timer has not expired) or transmit an RRC setup request (if the RRC timer has expired) as shown at steps 10-13. It is noted that in some examples where the wait timer is not used and the UE 301 has determined that the request has been rejected, then the UE 301 may immediately attempt RRC setup.

FIG. 4 is a logic flow diagram for implicit rejection of connection re-establishment. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the connection module 140-1 and/or 140-2 may include multiples ones of the blocks in FIG. 4, where each included block is an interconnected means for performing the function in the block. The blocks in FIG. 4 are assumed to be performed by the UE 110, e.g., under control of the connection module 140-1 and/or 140-2 at least in part.

According to one example embodiment, a method is provided including transmitting, from a user equipment, a request to reestablish a connection with a network node as indicated by block 400; receiving an early contention resolution message in response to the request as indicated by block 402; and determining whether or not the request is rejected by the network based at least in part on the early contention resolution message as indicated by block 404.

Determining whether or not the request is rejected by the network may include interpreting receipt of the early contention resolution message as an implicit rejection of the request. The method may further include receiving a system information message from the network node, wherein the system information message comprises an indication that the receipt of the early contention resolution message is to be treated as an implicit rejection. Determining whether the network rejected the request may be based on a medium access control layer control element identified by a specific logical channel identifier that is received in the early contention resolution message. The method may further comprise starting a first timer in response to receiving the early contention resolution message; and determining that the request is rejected by the network node in response to expiry of the first timer. A timer value for the first timer may be indicated in: a system information message from the network node, or the early contention resolution message. The method may further include starting a radio resource control timer upon transmitting the request; starting a second timer in response to receiving the early contention resolution message; and in response to expiry of the second timer: either initiating a random access channel procedure to reestablish the connection with the network node for the case the radio resource control timer is running, or transmitting a radio resource control setup request for the case the radio resource control timer is expired. A timer value for the second timer may be indicated in: a system information message from the network node, or the early contention resolution message. The method may include, in response to determining that the request is rejected by the network node, transitioning from a connected mode to an idle mode. Determining whether or not the request is rejected by the network may be performed dependent on a cell selection procedure indicating the connection is to be established with the network node as compared to a previous network node in which the user equipment was previously connected.

According to another example embodiment, an apparatus is provided including means for transmitting, from a user equipment, a request to reestablish a connection with a network node; means for receiving an early contention resolution message in response to the request; and means for determining whether or not the request is rejected by the network based at least in part on the early contention resolution message.

Determining whether or not the request is rejected by the network may include: interpreting receipt of the early contention resolution message as an implicit rejection of the request. The apparatus may further include means for receiving a system information message from the network node, wherein the system information message comprises an indication that the receipt of the early contention resolution message is to be treated as an implicit rejection. The apparatus may further include means for determining whether the network rejected the request is based on a medium access control layer control element identified by a specific logical channel identifier that is received in the early contention resolution message. The apparatus may further include means for starting a first timer in response to receiving the early contention resolution message; and means for determining that the request is rejected by the network node in response to expiry of the first timer. A timer value for the first timer may be indicated in: a system information message from the network node, or the early contention resolution message. The apparatus may further include means for starting a radio resource control timer upon transmitting the request; means for starting a second timer in response to receiving the early contention resolution message; and in response to expiry of the second timer: either means for initiating a random access channel procedure to reestablish the connection with the network node for the case the radio resource control timer is running, or means for transmitting a radio resource control setup request for the case the radio resource control timer is expired. A timer value for the second timer may be indicated in: a system information message from the network node, or the early contention resolution message. The apparatus may further include, in response to determining that the request is rejected by the network node, means for transitioning from a connected mode to an idle mode. Determining whether or not the request is rejected by the network may be performed dependent on a cell selection procedure indicating the connection is to be established with the network node as compared to a previous network node in which the user equipment was previously connected.

According to another example embodiment, an apparatus is provided including at least one processor; and at least one memory including computer program code; the at least one memory and the computer program code configured to, with the at least one processor, cause the apparatus at least to perform: transmitting, from a user equipment, a request to reestablish a connection with a network node; receiving an early contention resolution message in response to the request; and determining whether or not the request is rejected by the network based at least in part on the early contention resolution message.

Determining whether or not the request is rejected by the network may include interpreting receipt of the early contention resolution message as an implicit rejection of the request. The apparatus may further be configured to perform receiving a system information message from the network node, wherein the system information message comprises an indication that the receipt of the early contention resolution message is to be treated as an implicit rejection. Determining whether the network rejected the request may be based on a medium access control layer control element identified by a specific logical channel identifier that is received in the early contention resolution message. The apparatus may further be configured to perform starting a first timer in response to receiving the early contention resolution message; and determining that the request is rejected by the network node in response to expiry of the first timer. A timer value for the first timer may be indicated in: a system information message from the network node, or the early contention resolution message. The apparatus may further be configured to perform starting a radio resource control timer upon transmitting the request; starting a second timer in response to receiving the early contention resolution message; and in response to expiry of the second timer: either initiating a random access channel procedure to reestablish the connection with the network node for the case the radio resource control timer is running, or transmitting a radio resource control setup request for the case the radio resource control timer is expired. A timer value for the second timer may be indicated in: a system information message from the network node, or the early contention resolution message. The apparatus may further be configured to perform, in response to determining that the request is rejected by the network node, transitioning from a connected mode to an idle mode. Determining whether or not the request is rejected by the network may be performed dependent on a cell selection procedure indicating the connection is to be established with the network node as compared to a previous network node in which the user equipment was previously connected.

According to another example embodiment, a computer readable medium comprising program instructions is provided for causing an apparatus to perform at least the following: transmitting, from a user equipment, a request to reestablish a connection with a network node; receiving an early contention resolution message in response to the request; and determining whether or not the request is rejected by the network based at least in part on the early contention resolution message.

Determining whether or not the request is rejected by the network may include interpreting receipt of the early contention resolution message as an implicit rejection of the request. The program instructions may further cause the apparatus to perform receiving a system information message from the network node, wherein the system information message comprises an indication that the receipt of the early contention resolution message is to be treated as an implicit rejection. Determining whether the network rejected the request may be based on a medium access control layer control element identified by a specific logical channel identifier that is received in the early contention resolution message. The program instructions may further cause the apparatus to perform starting a first timer in response to receiving the early contention resolution message; and determining that the request is rejected by the network node in response to expiry of the first timer. A timer value for the first timer may be indicated in: a system information message from the network node, or the early contention resolution message. The program instructions may further cause the apparatus to perform starting a radio resource control timer upon transmitting the request; starting a second timer in response to receiving the early contention resolution message; and in response to expiry of the second timer: either initiating a random access channel procedure to reestablish the connection with the network node for the case the radio resource control timer is running, or transmitting a radio resource control setup request for the case the radio resource control timer is expired. A timer value for the second timer may be indicated in: a system information message from the network node, or the early contention resolution message. The program instructions may further cause the apparatus to perform, in response to determining that the request is rejected by the network node, transitioning from a connected mode to an idle mode. Determining whether or not the request is rejected by the network may be performed dependent on a cell selection procedure indicating the connection is to be established with the network node as compared to a previous network node in which the user equipment was previously connected.

FIG. 5 is a logic flow diagram for implicit rejection of connection re-establishment. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the control module 150-1 and/or 150-2 may include multiples ones of the blocks in FIG. 5, where each included block is an interconnected means for performing the function in the block. The blocks in FIG. 5 are assumed to be performed by a base station such as RAN node 170, e.g., under control of the control module 150-1 and/or 150-2 at least in part.

Referring to FIG. 5, according to one example embodiment, a method is provided including: receiving, from a user equipment, a request to reestablish a connection as indicated by block 500; and transmitting an early contention resolution message to the user equipment indicating whether or not the request is rejected as indicated by block 502.

The method may include transmitting a system information message, wherein the system information comprises an indication that receipt of the early contention resolution message is to be treated as an implicit rejection of the request. The method may include configuring a medium access control layer control element to indicate whether the request is rejected; and transmitting the control element with the early contention resolution message. Configuring the control element may include using a specific logical channel identifier to indicate the request is rejected, wherein the control element is identified by the specific logical channel identifier. The method may include: configuring a system information message or the early contention resolution message to include a value for a first timer that is to be started by the user equipment when the early contention resolution message is received, wherein expiry of the first timer indicates the request is rejected. The method may include configuring a system information message or the early contention resolution message to include a value for a second timer that is to be started by the user equipment when the early contention resolution message is received, wherein expiry of the second timer causes the user equipment to either initiate a random access channel procedure to reestablish the connection, or transmit a radio resource control setup request. The method may include determining that the request is to be rejected based on at least one of: an amount of congestion in the network node; failure to support the request; and retrieval of a user equipment context.

According to another example embodiment, an apparatus is provided including means for receiving, from a user equipment, a request to reestablish a connection; and means for transmitting an early contention resolution message to the user equipment indicating whether or not the request is rejected.

The apparatus may include means for transmitting a system information message, wherein the system information comprises an indication that receipt of the early contention resolution message is to be treated as an implicit rejection of the request. The apparatus may include means for configuring a medium access control layer control element to indicate whether the request is rejected; and means for transmitting the control element with the early contention resolution message. The means for configuring the control element may include means for using a specific logical channel identifier to indicate the request is rejected, wherein the control element is identified by the specific logical channel identifier. The apparatus may include means for configuring a system information message or the early contention resolution message to include a value for a first timer that is to be started by the user equipment when the early contention resolution message is received, wherein expiry of the first timer indicates the request is rejected. The apparatus may include means for configuring a system information message or the early contention resolution message to include a value for a second timer that is to be started by the user equipment when the early contention resolution message is received, wherein expiry of the second timer causes the user equipment to either initiate a random access channel procedure to reestablish the connection, or transmit a radio resource control setup request. The apparatus may include means for determining that the request is to be rejected based on at least one of: an amount of congestion in the network node; failure to support the request; and retrieval of a user equipment context.

According to another example embodiment, a computer readable medium comprising program instructions is provided for causing an apparatus to perform at least the following: receiving, from a user equipment, a request to reestablish a connection; and transmitting an early contention resolution message to the user equipment indicating whether or not the request is rejected.

The program instructions may further cause the apparatus to perform transmitting a system information message, wherein the system information comprises an indication that receipt of the early contention resolution message is to be treated as an implicit rejection of the request. The program instructions may further cause the apparatus to perform configuring a medium access control layer control element to indicate whether the request is rejected; and transmitting the control element with the early contention resolution message. Configuring the control element may include using a specific logical channel identifier to indicate the request is rejected, wherein the control element is identified by the specific logical channel identifier. The program instructions may further cause the apparatus to perform configuring a system information message or the early contention resolution message to include a value for a first timer that is to be started by the user equipment when the early contention resolution message is received, wherein expiry of the first timer indicates the request is rejected. The program instructions may further cause the apparatus to perform configuring a system information message or the early contention resolution message to include a value for a second timer that is to be started by the user equipment when the early contention resolution message is received, wherein expiry of the second timer causes the user equipment to either initiate a random access channel procedure to reestablish the connection, or transmit a radio resource control setup request. The program instructions may further cause the apparatus to perform determining that the request is to be rejected based on at least one of: an amount of congestion in the network node; failure to support the request; and retrieval of a user equipment context.

According to another example embodiment, an apparatus is provided including at least one processor; and at least one memory including computer program code; the at least one memory and the computer program code configured to, with the at least one processor, cause the apparatus at least to perform: receiving, from a user equipment, a request to reestablish a connection; and transmitting an early contention resolution message to the user equipment indicating whether or not the request is rejected.

The apparatus may further be configured to perform transmitting a system information message, wherein the system information comprises an indication that receipt of the early contention resolution message is to be treated as an implicit rejection of the request. The apparatus may further be configured to perform configuring a medium access control layer control element to indicate whether the request is rejected; and transmitting the control element with the early contention resolution message. Configuring the control element may include using a specific logical channel identifier to indicate the request is rejected, wherein the control element is identified by the specific logical channel identifier. The apparatus may further be configured to perform configuring a system information message or the early contention resolution message to include a value for a first timer that is to be started by the user equipment when the early contention resolution message is received, wherein expiry of the first timer indicates the request is rejected. The apparatus may further be configured to perform configuring a system information message or the early contention resolution message to include a value for a second timer that is to be started by the user equipment when the early contention resolution message is received, wherein expiry of the second timer causes the user equipment to either initiate a random access channel procedure to reestablish the connection, or transmit a radio resource control setup request. The apparatus may further be configured to perform determining that the request is to be rejected based on at least one of: an amount of congestion in the network node; failure to support the request; and retrieval of a user equipment context.

Without in any way limiting the scope, interpretation, or application of the claims appearing below, a technical effect of one or more of the example embodiments disclosed herein is reducing UE re-connection latency as no RRC timer needs to expire before the re-establishment attempt can be considered as failed. Another technical effect of one or more of the example embodiments disclosed herein is allowing the network to reject the Re-establishment request by the UE implicitly or explicitly in the MAC layer.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
    transmitting, from a user equipment, a request to one of establish or reestablish a radio resource control connection with a network node;
    receiving an early contention resolution message in response to the request; and
    determining the request is rejected by the network based at least in part on the early contention resolution message,
    wherein the determining comprises at least one of:
    determining the request is rejected based on a medium access control layer control element identified by a specific logical channel identifier that is received in the early contention resolution message, or
    starting a first timer in response to receiving the early contention resolution message and determining that the request is rejected by the network node in response to expiry of the first timer.

2. The method of claim 1, further comprising: receiving a system information message from the network node, wherein the system information message comprises an indication that the receipt of the early contention resolution message is to be treated as an implicit rejection.

3. The method of claim 1, wherein a timer value for the first timer is indicated in: a system information message from the network node, or the early contention resolution message.

4. The method of claim 1, further comprising:
    starting a radio resource control timer upon transmitting the request; starting a second timer in response to receiving the early contention resolution message; and
    in response to expiry of the second timer:
    either initiating a random access channel procedure to reestablish the connection with the network node for the case the radio resource control timer is running, or transmitting a radio resource control setup request for the case the radio resource control timer is expired.

5. The method of claim 4, wherein a timer value for the second timer is indicated in: a system information message from the network node, or the early contention resolution message.

6. A method of claim 1, wherein, in response to determining that the request is rejected by the network node, transitioning from a connected mode to an idle mode.

7. An apparatus comprising:
at least one processor; and
at least one memory including computer-program code, the at least one memory and the computer-program code configured to, with the at least one processor, cause the apparatus to at least:
transmit a request to one of establish or reestablish a radio resource control connection with a network node;
receive an early contention resolution message in response to the request; and
determine the request is rejected by the network based at least in part on the early contention resolution message, wherein the determining comprises at least one of:
determining the request is rejected based on a medium access control layer control element identified by a specific logical channel identifier that is received in the early contention resolution message, or
starting a first timer in response to receiving the early contention resolution message and determining that the request is rejected by the network node in response to expiry of the first timer.

8. The apparatus of claim 7, wherein the at least one memory and the computer-program code are further configured to, with the at least one processor, cause the apparatus to at least:
receive a system information message from the network node, wherein the system information message comprises an indication that the receipt of the early contention resolution message is to be treated as an implicit rejection.

9. The apparatus of claim 7, wherein a timer value for the first timer is indicated in: a system information message from the network node, or the early contention resolution message.

10. The apparatus of claim 7, wherein the at least one memory and the computer-program code are further configured to, with the at least one processor, cause the apparatus to at least:
start a radio resource control timer upon transmitting the request; start a second timer in response to receiving the early contention resolution message; and
in response to expiry of the second timer: either initiate a random access channel procedure to reestablish the connection with the network node for the case the radio resource control timer is running, or transmit a radio resource control setup request for the case the radio resource control timer is expired.

11. The apparatus of claim 10, wherein a timer value for the second timer is indicated in: a system information message from the network node, or the early contention resolution message.

12. The apparatus of claim 7, wherein, in response to determining that the request is rejected by the network node, the at least one memory and the computer-program code are further configured to, with the at least one processor, cause the apparatus to at least; transition from a connected mode to an idle mode.

13. The apparatus of claim 7, wherein determining the request is rejected by the network is performed dependent on a cell selection procedure indicating the connection is to be established with the network node as compared to a previous network node in which the apparatus was previously connected.

14. An apparatus comprising: at least one processor; and at least one memory including computer-program code, the at least one memory and the computer-program code configured to, with the at least one processor, cause the apparatus to at least:
receive, from a user equipment, a request to one of establish or reestablish a radio resource control connection; and
transmit an early contention resolution message to the user equipment to enable user equipment determination of the request being rejected,
wherein the determination is based on at least one of:
determination of the request being rejected based on a medium access control layer control element identified by a specific logical channel identifier that is received in the early contention resolution message, or
a start of a first timer in response to receiving the early contention resolution message and determining that the request is rejected by the network node in response to expiry of the first timer.

* * * * *